US009960668B2

(12) United States Patent
Wang et al.

(10) Patent No.: US 9,960,668 B2
(45) Date of Patent: May 1, 2018

(54) METHOD AND DEVICE FOR CONTROLLING START OF SWITCHING RECTIFIER, AND STORAGE MEDIUM (71) Applicant: ZTE Corporation, Shenzhen, Guangdong (CN)

(72) Inventors: Mingjin Wang, Shenzhen (CN); Dacheng Zheng, Shenzhen (CN); Yundong Yang, Shenzhen (CN); Qiong Wu, Shenzhen (CN); Zhe Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 37 days.

(21) Appl. No.: 14/901,928

(22) PCT Filed: Jun. 6, 2014

(86) PCT No.: PCT/CN2014/079388
§ 371 (c)(1),
(2) Date: Dec. 29, 2015

(87) PCT Pub. No.: WO2014/173363
PCT Pub. Date: Oct. 30, 2014

(65) Prior Publication Data
US 2016/0301324 A1 Oct. 13, 2016

(30) Foreign Application Priority Data
Aug. 16, 2013 (CN) .......................... 2013 1 0360219

(51) Int. Cl.
H02M 1/00 (2006.01)
H02M 1/36 (2007.01)
(52) U.S. Cl.
CPC ...... H02M 1/36 (2013.01); H02M 2001/0009 (2013.01)

(58) Field of Classification Search
CPC .... H02M 1/081; H02M 7/00; H02M 3/33592; H02M 7/217; H02M 7/219
(Continued)

(56) References Cited

U.S. PATENT DOCUMENTS 7,894,219 B2  2/2011 Zong
2012/0294052 A1* 11/2012 Reddy .................. H02M 1/36
                                                    363/49
2013/0088894 A1  4/2013 Pal

FOREIGN PATENT DOCUMENTS

CN      1859001 A    11/2006
CN    201134749 Y    10/2008
(Continued)

OTHER PUBLICATIONS

Supplementary European Search Report in international application No. 14787591.8, dated Mar. 20, 2017.
(Continued)

Primary Examiner — Nguyen Tran
(74) Attorney, Agent, or Firm — Oppedahl Patent Law Firm LLC (57) ABSTRACT The present disclosure provides a method for controlling soft start of a switching rectifier, which comprises: acquiring an external environmental parameter of the switching rectifier and a power supply characteristic parameter of an object to be powered, establishing a voltage start strategy and/or a current start strategy for the switching rectifier according to the external environmental parameter and the power supply characteristic parameter, and controlling a voltage and/or a current of the switching rectifier to start to a full-load voltage and/or a full-load current according to the voltage start strategy and/or the current start strategy. The present disclosure further provides a device for controlling soft start of a switching rectifier. The technical scheme of the present disclosure is able to provide a suitable voltage and/or
(Continued)

current start approach for a switching rectifier according to power supply requirements of an object to be powered and operating environment of the switching rectifier.

9 Claims, 4 Drawing Sheets

(58) Field of Classification Search
USPC .............................. 363/49, 52, 84, 125, 127
See application file for complete search history.

(56) References Cited

FOREIGN PATENT DOCUMENTS

| CN | 201191806 Y | 2/2009 |
|---|---|---|
| CN | 101741233 A | 6/2010 |
| CN | 102624210 A | 8/2012 |
| CN | 102801297 A | 11/2012 |
| CN | 202565185 U | 11/2012 |
| CN | 103066864 A | 4/2013 |
| EP | 2299572 A1 | 3/2011 |
| JP | 2012138387 A | 7/2012 |
| RU | 2012989 C1 | 5/1994 |
| RU | 2484574 C2 | 6/2013 |
| WO | 2009154545 A1 | 12/2009 |
| WO | 2013060797 A1 | 5/2013 |

OTHER PUBLICATIONS

English Translation of the Written Opinion of the International Search Authority in international application No. PCT/CN2014/079388, dated Sep. 9, 2014.

International Search Report in international application No. PCT/CN2014/079388, dated Sep. 11, 2014.

* cited by examiner

METHOD AND DEVICE FOR CONTROLLING START OF SWITCHING RECTIFIER, AND STORAGE MEDIUM

TECHNICAL FIELD

The present disclosure relates to technology of power supply control, in particular to a method and device for controlling start of a switching rectifier as well as a storage medium.

BACKGROUND

A communication power supply is an equipment for supplying energy for a communication equipment such as communication base station or communication machine room. A switching rectifier is the core constituent component of the communication power supply. For the sake of requirement of high reliability in the field of communication, it is required that a communication power supply is able to supply energy for a communication equipment under various conditions. This requires that the switching rectifier can start with load under various conditions. For example, the switching rectifier is required to start with full load in an environment of −40 degrees centigrade, or start with full load when the communication equipment is powered by a fuel generator, and the like. In addition, industry standards limit amplitude of output voltage overshoot and soft-start time in switching on/off. Since environment conditions in which a communication equipment is applied are different, it is necessary to establish a reasonable soft-start strategy, such that the switching rectifier may start successfully under any condition.

Unfortunately, there is an absence of a switching rectifier suitable for various application environments at present.

SUMMARY

In order to address above technical problem, embodiments of the present disclosure provide a method and device for controlling start of a switching rectifier as well as a storage medium, such that the switching rectifier can start with load according to requirements on voltage and/or current from its power supply device and external environmental factors.

The technical scheme of the present disclosure is implemented as follows.

A method for controlling soft start of a switching rectifier, which includes:

an external environmental parameter of a switching rectifier and a power supply characteristic parameter of an object to be powered are acquired, a voltage start strategy and/or a current start strategy are established for the switching rectifier according to the external environmental parameter and the power supply characteristic parameter, and a voltage and/or a current of the switching rectifier are controlled to start to a full-load voltage and/or a full-load current according to the voltage start strategy and/or the current start strategy.

In an embodiment, the voltage start strategy may include:

a duration for boosting the voltage of the switching rectifier to the full-load voltage is determined according to the external environmental parameter and the power supply characteristic parameter, and the voltage of the switching rectifier is boosted from an initial voltage to the full-load voltage of the switching rectifier within the duration; or at least one intermediate voltage is determined between the initial voltage and the full-load voltage of the switching rectifier according to the external environmental parameter and the power supply characteristic parameter, voltage boost sections are obtained using the initial voltage and the full-load voltage as endpoints and using the at least one intermediate voltage as sectioning point(s), a voltage boost duration of each of the voltage boost sections is determined, and the voltage of the switching rectifier is boosted in sequence according to determined voltage boost durations.

In an embodiment, the current start strategy may include:

a duration for boosting the current of the switching rectifier to the full-load current is determined according to the external environmental parameter and the power supply characteristic parameter, and the current of the switching rectifier is boosted from an initial current to the full-load current within the duration; or at least one intermediate current is determined between the initial current and the full-load current of the switching rectifier according to the external environmental parameter and the power supply characteristic parameter, current boost sections are obtained using the initial current and the full-load current as endpoints and using the at least one intermediate current as sectioning point(s), a current boost duration of each of the current boost sections is determined, and the current of the switching rectifier is boosted in sequence according to determined current boost durations.

In an embodiment, the power supply characteristic parameter may be acquired by a sampling operation performed on a power supply circuit of the switching rectifier or based on power supply requirements of the object to be powered.

In an embodiment, the external environmental parameter of the switching rectifier may include at least one of the following parameters:

temperature, humidity, granularity of dust, electric field intensity and magnetic field intensity;

the power supply characteristic parameter may include at least one of the following parameters:

input voltage, input current, maximal input power, etc.

A device for controlling start of a switching rectifier, which includes an acquisition unit, a strategy establishment unit and a control unit, in which the acquisition unit is configured to acquire an external environmental parameter of a switching rectifier and a power supply characteristic parameter of an object to be powered, the strategy establishment unit is configured to establish a voltage start strategy and/or a current start strategy according to the external environmental parameter and the power supply characteristic parameter, the control unit is configured to control the a voltage and/or a current of the switching rectifier to start to a full-load voltage and/or a full-load current according to the voltage start strategy and/or the current start strategy.

In an embodiment, the strategy establishment unit may be further configured to:

determine a duration for boosting the voltage of the switching rectifier to the full-load voltage according to the external environmental parameter and the power supply characteristic parameter, and boost the voltage of the switching rectifier from an initial voltage to the full-load voltage of the switching rectifier within the duration; or determine at least one intermediate voltage between the initial voltage and the full-load voltage of the switching rectifier according to the external environmental parameter and the power supply characteristic parameter, obtain voltage boost sections using the initial voltage and the full-load voltage as endpoints and using the at least one intermediate voltage as sectioning point(s), determine a voltage boost duration of each of the voltage boost sections, and boost the voltage of the switching rectifier in sequence according to determined voltage boost durations.

In an embodiment, the strategy establishment unit may be further configured to:

determine a duration for boosting the current of the switching rectifier to the full-load current according to the external environmental parameter and the power supply characteristic parameter, and boost the current of the switching rectifier from an initial current to the full-load current within the duration; or determine at least one intermediate current between the initial current and the full-load current of the switching rectifier according to the external environmental parameter and the power supply characteristic parameter, obtain current boost sections using the initial current and the full-load current as endpoints and using the at least one intermediate current as sectioning point(s), determine a current boost duration of each of the current boost sections, and boost the current of the switching rectifier in sequence according to determined current boost durations.

In an embodiment, the acquisition unit may be further configured to acquire the power supply characteristic parameter by performing a sampling operation on a power supply circuit of the switching rectifier or based on power supply requirements of the object to be powered.

In an embodiment, the external environmental parameter of the switching rectifier may include at least one of the following parameters:

temperature, humidity, granularity of dust, electric field intensity and magnetic field intensity;

the power supply characteristic parameter may include at least one of the following parameters:

input voltage, input current, maximal input power, etc.

A storage medium stores a computer program which is configured to implement the method for controlling soft start of a switching rectifier as described above.

In the embodiments of the present disclosure, when a switching rectifier starts, an external environmental parameter and a power supply characteristic parameter of its corresponding object to be powered are acquired, a voltage start strategy and/or a current start strategy are established for the switching rectifier according to the external environmental parameter and the power supply characteristic parameter, and a soft start of the switching rectifier is controlled according to the voltage start strategy and/or the current start strategy until a full-load voltage and/or a full-load current are supplied to a load. The technical scheme of the present disclosure provides a possibility of a provision of an adequate voltage and/or current start for an object to be powered according to requirements of the object to be powered and its operating environment, such that the switching rectifier may start with load according to the requirements on voltage and/or current from its power supply device and external environmental factors.

DETAILED DESCRIPTION

The object, technical scheme and advantage of the present disclosure will be more apparent upon a further detailed description of the present disclosure made according to embodiments with reference to accompanying drawings.

A soft-start strategy of a switching rectifier according to embodiments of the present disclosure allows a DC-DC part of the switching rectifier to start with full load under various operating conditions. The method of soft start takes use of a DSP to implement digital control, and the topological structure of the DC-DC part is that of an LLC resonant converter. The start strategy includes a voltage soft-start strategy and a current soft-start strategy. In the case of a voltage soft start, a voltage loop reference value is continuously varied according to the operating environment of the switching rectifier until the voltage loop reference value reaches a voltage value set by a monitoring unit. In the case of a current soft start, a current loop reference value is continuously varied according to the operating environment of the switching rectifier until the current loop reference value reaches a current-limiting point set by the monitoring unit. After both of the voltage soft start and the current soft start complete, the soft start of the entire switching rectifier will end.

In an embodiment of the present disclosure, the loop structure of the DC-DC part of the switching rectifier includes at least a voltage loop and a current loop in parallel. The soft start of the switching rectifier includes voltage soft start and current soft start which belong to closed-loop soft start.

In an embodiment of the present disclosure, the topological structure of the DC-DC converter is not limited to an LLC resonant converter. Other topological structures such as phase shift full-bridge and half-bridge may be applicable to the embodiment of the present disclosure.

Figure 1:
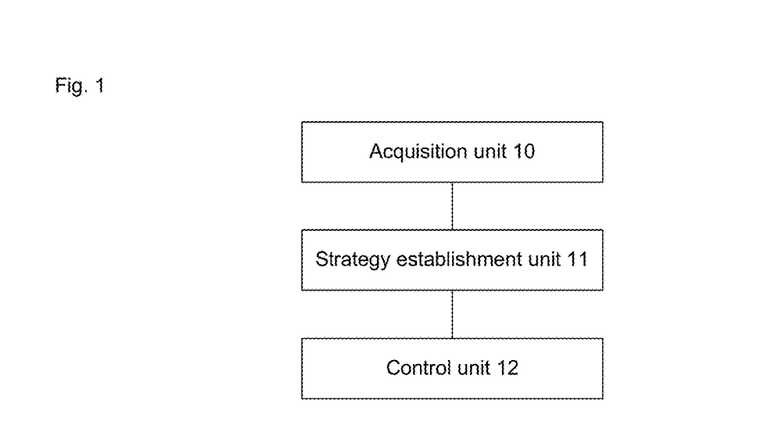
FIG. 1 is a schematic view of component structure of a device for controlling start of a power supply according to an embodiment of the present disclosure.

FIG. 1 is a schematic view of component structure of the device for controlling start of a switching rectifier according to the embodiments of the present disclosure. As shown in FIG. 1, the device for controlling start of a switching rectifier according to the embodiments of the present disclosure includes an acquisition unit 10, a strategy establishment unit 11 and a control unit 12, in which the acquisition unit 10 is configured to acquire an external environmental parameter of the switching rectifier and a power supply characteristic parameter of an object to be powered;

the strategy establishment unit 11 is configured to establish a voltage start strategy and/or a current start strategy according to the external environmental parameter and the power supply characteristic parameter;

the control unit 12 is configured to control the a voltage and/or a current of the switching rectifier to start to a full-load voltage and/or a full-load current according to the voltage start strategy and/or the current start strategy.

Said strategy establishment unit 11 is further configured to:

determine a duration for boosting the voltage of the switching rectifier to the full-load voltage according to the external environmental parameter and the power supply characteristic parameter, and boost the voltage of the switching rectifier from an initial voltage to the full-load voltage of the power supply within the duration; as required, the voltage may be boosted in a set curve (at a non-uniform speed) such as exponentially or in a set straight line (at a uniform speed); or determine at least one intermediate voltage between the initial voltage and the full-load voltage of the switching rectifier according to the external environmental parameter and the power supply characteristic parameter, obtain voltage boost sections using the initial voltage and the full-load voltage as endpoints and using the at least one intermediate voltage as sectioning point(s), determine a voltage boost duration of each of the voltage boost sections, and boost the voltage of the switching rectifier in sequence according to determined voltage boost durations. It should be noted that the intermediate voltage is not necessary to be set, instead, it is set mainly according to the requirements of power supply, and one or more intermediate voltages may be set.

Said strategy establishment unit 11 is further configured to:

determine a duration for boosting the current of the switching rectifier to the full-load current according to the external environmental parameter and the power supply characteristic parameter, and boost the current of the switching rectifier from an initial current to the full-load current within the duration, the current may be boosted in a set curve (at a non-uniform speed) such as exponentially or in a set straight line (at a uniform speed); or determine at least one intermediate current between the initial current and the full-load current of the switching rectifier according to the external environmental parameter and the power supply characteristic parameter, obtain current boost sections using the initial current and the full-load current as endpoints and using the at least one intermediate current as sectioning point(s), determine a current boost duration of each of the current boost sections, and boost the current of the switching rectifier in sequence according to determined current boost durations. The intermediate current is not necessary to be set, instead, it is set mainly according to the requirements of power supply, and one or more intermediate currents may be set.

Said acquisition unit 10 is further configured to acquire the power supply characteristic parameter by performing a sampling operation on a power supply circuit of the switching rectifier or based on power supply requirements of the object to be powered.

The external environmental parameter of the switching rectifier includes at least one of the following parameters:

temperature, humidity, granularity of dust, electric field intensity and magnetic field intensity;

the power supply characteristic parameter comprises at least one of the following parameters: input voltage, input current, maximal input power, etc.

It should be noted that above-mentioned acquisition unit may be implemented with a sampling circuitry. Or, a determined power supply characteristic parameter and the like may be configured in the acquisition unit. Then, the acquisition unit may be implemented with CPU, DSP, FPGA or microprocessor. Each of the strategy establishment unit 11 and the control unit 12 may be implemented with CPU, DSP, FPGA or microprocessor.

The essence of the device for controlling start of a switching rectifier according to embodiments of the present disclosure will be further described with following specific examples.

Figure 2:
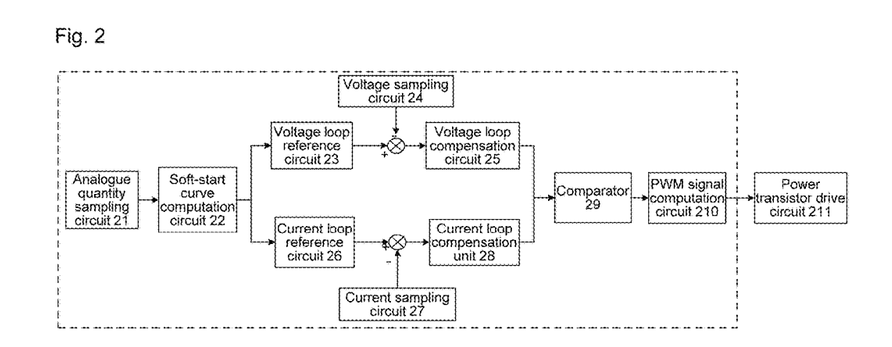
FIG. 2 is a structural diagram of a specific implementation of the device for controlling start of a power supply according to an embodiment of the present disclosure.

FIG. 2 is a structural diagram of an implementation of the device for controlling start of a switching rectifier according to an embodiment of the present disclosure. In the embodiment of the present disclosure as shown in FIG. 2, an analogue quantity sampling circuit 21 samples analogue quantities such as ambient temperature and voltage of input power supply device; a soft-start curve computation circuit 22 computes a soft-start curve or a start line according to the sampled analogue quantities and provides it to a voltage loop reference circuit 23 and a current loop reference circuit 26; the voltage loop reference circuit 23 set a reference voltage according to the soft-start curve computed by the soft-start curve computation circuit 22; the reference voltage is compared with a voltage detected by a voltage sampling circuit 24 to obtain an error; a voltage loop compensation circuit 25 regulates and amplifies this error and outputs it to a comparator 29; at the same time, the current loop reference circuit 26 sets a reference current according to the soft-start curve or the start line computed by the soft-start curve computation circuit 22; this reference current is compared with a current detected by a current sampling circuit 27 to obtain an error; a current loop compensation circuit 28 regulates and amplifies this error and outputs it to the comparator 29; the comparator 29 compares and screens output of the voltage loop compensation circuit 25 and output of the current loop compensation circuit 28, and sends its resulting signal to a Pulse-Width Modulation PWM signal computation circuit 210; a drive signal transmitted by the PWM signal computation circuit 210 is amplified by a power transistor drive circuit 211 to drive a power transistor to operate. This is a closed-loop regulation process for implementing soft start of the switching rectifier.

Figure 3:
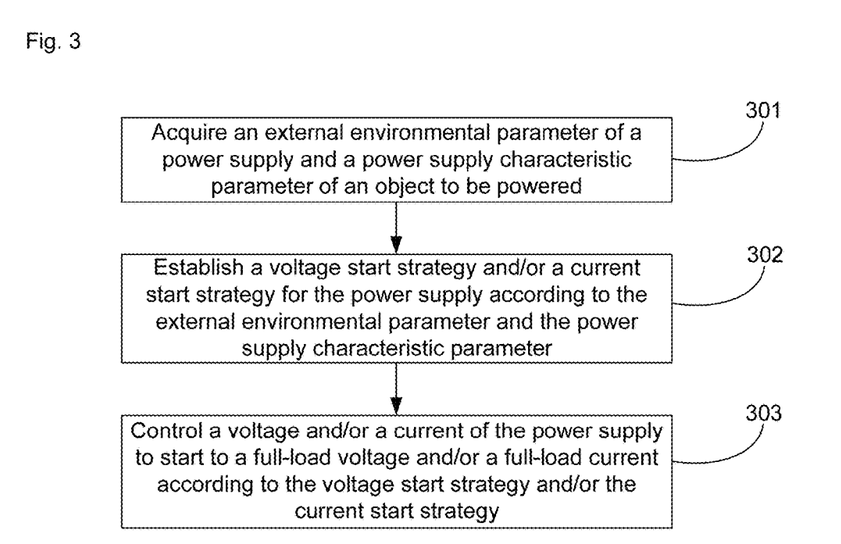
FIG. 3 is a flow chart of a method for controlling start of a power supply according to an embodiment of the present disclosure.

FIG. 3 is a flow chart of the method for controlling start of a switching rectifier according to an embodiment of the present disclosure. As shown the FIG. 3, the method for controlling start of a switching rectifier according to an embodiment of the present disclosure includes:

Step 301, an external environmental parameter of a switching rectifier and a power supply characteristic parameter of an object to be powered are acquired.

The power supply characteristic parameter and the external environmental parameter are acquired by a sampling operation performed on a power supply circuit of the switching rectifier. Or, the power supply characteristic parameter is acquired based on power supply requirements of the object to be powered.

The external environmental parameter of the switching rectifier includes at least one of the following parameters:

temperature, humidity, granularity of dust, electric field intensity and magnetic field intensity;

the power supply characteristic parameter comprises at least one of the following parameters:

input voltage, input current, maximal input power, etc.

Specifically, the external environmental parameter, such as temperature or humidity, of the power supply circuit may be acquired with a temperature or humidity sampler. Parameters such as granularity of dust may be also acquired in the same way. The characteristic parameter of the power supply device may be detected with a detection circuit or preset manually according to actual application scenarios prior to the installation of the rectifier product.

Step 302, a voltage start strategy and/or a current start strategy for the switching rectifier are established according to the external environmental parameter and the power supply characteristics parameter.

The voltage start strategy includes:

a duration for boosting a voltage of the switching rectifier to a full-load voltage is determined according to the external environmental parameter and the power supply characteristic parameter, and the voltage of the switching rectifier is boosted from an initial voltage to the full-load voltage at a uniform speed within the duration, the voltage may be boosted in a set curve (at a non-uniform speed) such as exponentially or in a set straight line (at a uniform speed); or at least one intermediate voltage is determined between the initial voltage and the full-load voltage of the switching rectifier according to the external environmental parameter and the power supply characteristic parameter, voltage boost sections are obtained using the initial voltage and the full-load voltage as endpoints and using the at least one intermediate voltage as sectioning point(s), a voltage boost duration of each of the voltage boost sections is determined, and the voltage of the switching rectifier is boosted in sequence according to determined voltage boost durations. The intermediate current is not necessary to be set, instead, it is set mainly according to power supply requirements, and one or more intermediate currents may be set.

The current start strategy includes:

a duration for boosting the current of the switching rectifier to the full-load current is determined according to the external environmental parameter and the power supply characteristic parameter, and the current of the switching rectifier is boosted from an initial current to the full-load current within the duration, the current may be boosted in a set curve (at a non-uniform speed) such as exponentially or in a set straight line (at a uniform speed); or at least one intermediate current is determined between the initial current and the full-load current of the switching rectifier according to the external environmental parameter and the power supply characteristic parameter, current boost sections are obtained using the initial current and the full-load current as endpoints and using the at least one intermediate current as sectioning point(s), a current boost duration of each of the current boost sections is determined, and the current of the switching rectifier is boosted in sequence according to determined current boost durations. The intermediate current is not necessary to be set, instead, it is set mainly according to the requirements of power supply, and one or more intermediate currents may be set.

In the embodiments of the present disclosure, the voltage start and the current start may be performed in parallel. Of course, only one of the voltage start or the current start of the power supply circuit may be performed as required.

Step 303, a voltage and/or a current of the switching rectifier are controlled to start to a full-load voltage and/or a full-load current according to the voltage start strategy and/or the current start strategy.

The start voltage and/or the current start of the power supply circuit for the switching rectifier are adjusted according said voltage start strategy and/or the current start strategy, such that the start voltage and/or the start current are regulated to the full-load voltage and/or the full-load current smoothly.

The essence of the technical scheme of the embodiments of the present disclosure will be further described in examples of specific compensation for rectifier.

Embodiment 1

An LLC resonant DC-DC converter has characteristics as follows: (1) since resonant elements operate in a sinusoidal resonant state, a voltage across a switching transistor crosses zero naturally, the turn on/off in a zero voltage across the switching transistor in primary side may be implemented in a range of frequency conversion, leading to a reduced loss of power supply; (2) the reduced loss allows a higher operating frequency, reduced volume and cost of a converter and an enhanced power density; (3) a diode in secondary side is turned off naturally, eliminating a voltage spike in secondary side and reducing turn-off loss. Therefore, due to significant advantages in conversion efficiency and power density, the LLC resonant converter is favoured by those skilled in the industry of switched-mode power supply. At present, the DC-DC part in a latest switching rectifier for communication uses, in majority, the topological structure of a LLC resonant converter.

However, the LLC resonant converter has problems as following: it is not able to implement a complete soft switching when operating in a low voltage with a slight load, and its switching frequency will be rather high at this time for its relative large switching loss. In the case of a long term operation in a low voltage with a slight load, the power transistor will be damaged because of increased temperature accumulated from the switching loss.

Figure 4:
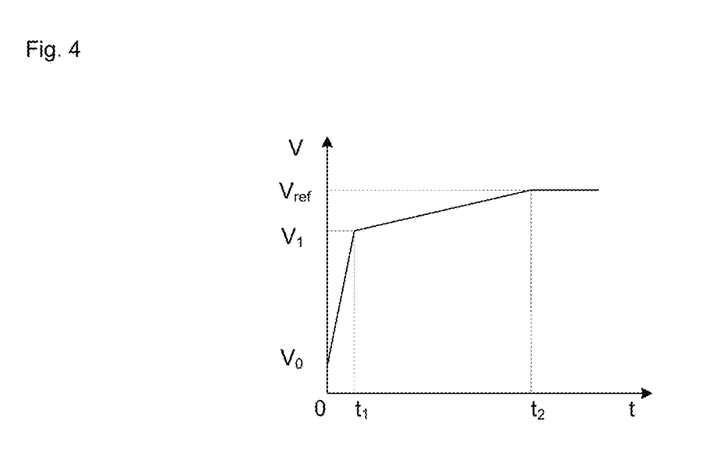
FIG. 4 is a schematic view of a voltage start according to a first embodiment of the present disclosure.

In a soft start of the DC-DC part, in the case that the load is tiny and the output voltage is low at the very beginning of operation, if the soft start takes a long time, i.e. operating under this condition for a long time, the power transistor will be damaged because of increased temperature accumulated from the switching loss. Thus, the output voltage is required to increase rapidly at the beginning of the start. The switching rectifier for communication limits the over-regulation of the output voltage during the start. If the output voltage increases to fast during the entire soft start process, the over-regulation of the output voltage will exceed an allowable range. For reasons described above, the soft-start strategy of the output voltage is as shown in FIG. 4: at the beginning of the start, a reference value of a voltage loop in the voltage soft start is boosted from $V_0$ to $V_1$ within a duration $t_1$, which is relatively short; the reference value of the voltage loop in the voltage soft start is boosted from $V_1$ to a value $V_{ref}$ set by a monitoring unit within a duration from $t_2$ to $t_1$, which is relatively long and therefore will not lead to the problem of output voltage overshoot.

Figure 5:
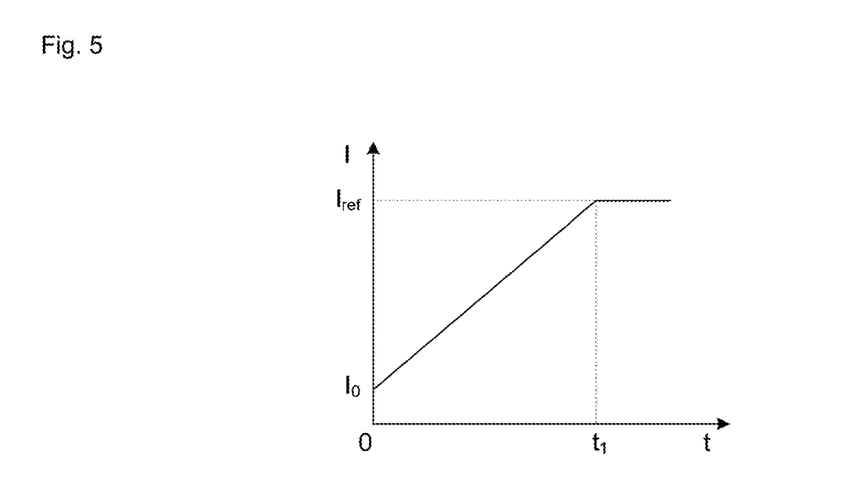
FIG. 5 is a schematic view of a current start according to the first embodiment of the present disclosure.

In addition, industry standards limit the inrush starting current in the soft start, and thus it is required to limit output current during start. Thus, as shown in FIG. 5, a current-limiting point is set at $I_0$ at the beginning of a soft start and the current-limiting point goes to a current-limiting point $I_{ref}$ issued by the monitoring unit after a duration $t_1$. In this way, the inrush starting current is also limited with the current soft-start strategy.

In this embodiment, values of $t_1$ and $V_1$ may be determined according to the external environmental parameter and the power supply characteristic parameter of an object to be powered or may be determined in advance. $V_0$ and $I_0$ are particular values in a power supply circuit. Values of initial voltage and of initial current of different power supplies may have some differences, but they may be determined based on characteristics of respective power supplies. $I_{ref}$ is determined according to the external environmental parameter and the power supply characteristic parameter of an object to be powered, and may be also determined in advance.

Embodiment 2

A communication power supply system in an outdoor base station is generally equipped with a fuel generator, and fuel generators of different power levels may be used depending on a required load, such as a common used three-phase 10 KW fuel generator used in small outdoor base stations. The problem of this fuel generator is that when its loads in three phases are unbalanced, the alternating input voltage in one or two phases with less load may go to a high level, such that overvoltage protection of the rectifier to which the fuel generator supplies power is triggered due to the input overvoltage. Thus, it is required that the three-phase fuel generator can balance loads in its three phases. This requires that rectifiers of the three phases of the fuel generator may have their loads balanced. However, when the fuel generator starts with rectifiers, the difference in hardware make it impossible to ensure simultaneous start and equilibrating of loads of rectifiers of the three phases of the fuel generator. Thus, without an optimization with respect to strategy, it is difficult to ensure absence of the problem that overvoltage protection is triggered by detection of an input overvoltage by a rectifier due to unbalanced voltages in three phases when the fuel generator starts with load.

The alternating input voltage in a certain phase will exceed an input overvoltage protection threshold when the degree of unbalance of loads carried by three phases of the three-phase fuel generator exceeds a range. Thus, the occurrence of this phenomenon may be avoided by limiting the soft-start strategy.

In this embodiment, the current soft start of the DC-DC part of the rectifier is limited, i.e. power deviation of load in each phase of the three-phase fuel generator is limited in an allowable range by changing the slope of the current soft start.

Figure 6:
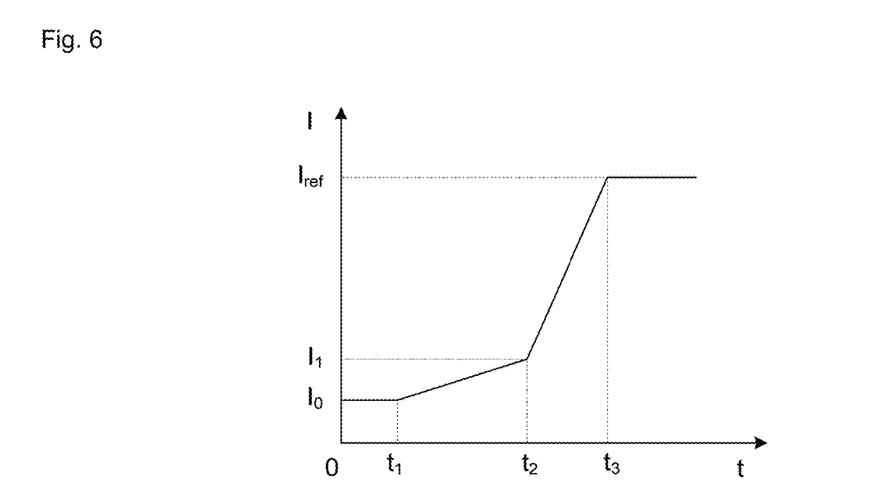
FIG. 6 is a schematic view of a current start according to a second embodiment of the present disclosure.

FIG. 6 shows a relationship between the current loop reference value of the DC-DC part of the rectifier and time. At the very beginning, a current-limiting point is fixed to $I_0$ and remains unchanged for a duration $t_1$; the current-limiting point increases from $I_0$ to $I_1$ within a duration between $t_1$ and $t_2$ which is relatively longer; a smooth variation of the current-limiting point within both of the durations ensures that a rectifier in each phase of the three-phase fuel generator has a certain load, and the degrees of unbalance of the loads in the three phases has small differences, thus the problem of large deviation of input voltages in the three phases will not occur; subsequently, the current-limiting point increases fast from $I_1$ to $I_{ref}$ within a duration between $t_2$ and $t_3$, the current-limiting soft start finishes. Additionally, in this process, the voltage soft start remains the same as shown in FIG. 4.

In this example, values of $t_1$ and $V_1$ may be determined according to the external environmental parameter and the power supply characteristic parameter of an object to be powered or may be determined in advance. $V_0$ and $I_0$ are particular values in a power supply circuit. Values of initial voltage and of initial current of different power supplies may have some differences, but they may be determined based on characteristics of respective power supplies. $I_{ref}$ is determined according to the external environmental parameter and the power supply characteristic parameter of an object to be powered, or may be also determined in advance. The $t_2$ and $t_3$ may be determined according to the external environmental parameter and the power supply characteristic parameter of an object to be powered, or may be also determined in advance.

Embodiment 3

At present, the market requires that switching rectifiers may operate normally at low temperature, or starts with full load directly after a period of storage at low temperature. For example, some clients require that switching rectifiers may start with full load at a temperature of −40 degrees centigrade. However, performance of some devices in a switching rectifier may degrade dramatically, which makes the switching rectifier unable to start with full load. Then, typically, some protective actions interior to the switching rectifier are triggered, leading to a failure in soft start.

The soft start with full load of the switching rectifier may be achieved by modifying the soft-start strategy. Reasonably-set current soft-start curve and voltage soft-start curve allow the switching rectifier to change its soft-start strategy depending on ambient temperature, so as to implement start with full load successfully without triggering some protective actions interior to the rectifier.

Figure 7:
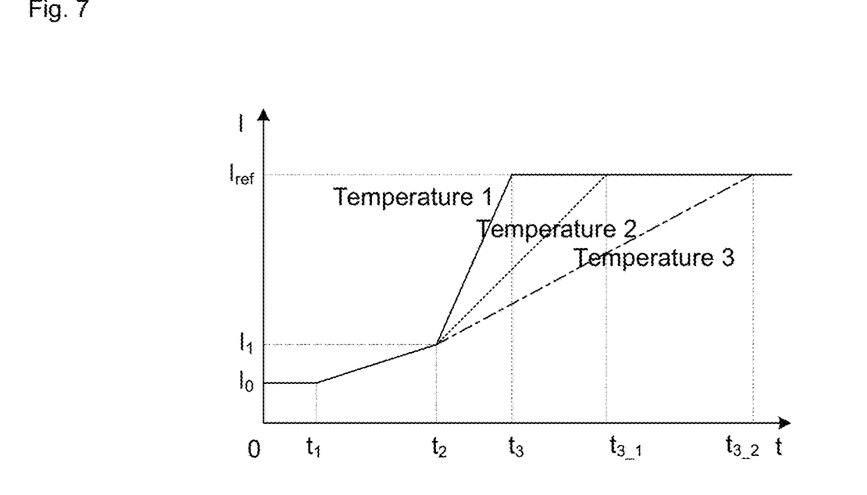
FIG. 7 is a schematic view of a current start according to a third embodiment of the present disclosure.

As shown in FIG. 7, according to the current soft-start strategy in the DC-DC part, at the very beginning, a current-limiting point is fixed to $I_0$ and remains unchanged for a duration $t_1$; the current-limiting point increases from $I_0$ to $I_1$ within a duration between $t_1$ and $t_2$; the current soft-start strategy from $t_0$ to $t_2$ is the same as that in embodiment 2. The time which the current reference value takes for increasing from $I_1$ to $I_{ref}$ has a slope changing with temperature other than being constant, i.e. the duration from $t_2$ to $t_3$ changes with the ambient temperature of the rectifier. Of course, this requires a temperature sensor which can detect the ambient temperature at which the rectifier operates.

The embodiments of the present disclosure further discloses a rectifier which includes the device for controlling start of a power supply as described above.

The method and device for controlling start of a power supply according to the embodiments of the present disclosure may be implemented with DSP and also in other ways. For example, reference values of the voltage loop and the current loop are computed and set in a digital and analogue combining way, i.e. with a single chip microcomputer. The voltage loop compensation network and the current loop compensation network may be implemented with an analogue circuit. All of them may be further implemented with an analogue circuit. This will not be repeated here.

The embodiments of the present disclosure also discloses a storage medium in which a computer program is stored, the computer program being configured to implement the method for controlling soft start of a switching rectifier in previous embodiments.

Obviously, those skilled in the art should understand that various modules and steps of the disclosure as describe above may be implemented with universal computing apparatus, integrated in a single computing apparatus or distributed on a network constituted by multiple computing apparatus. Optionally, they may be implemented with program codes which can be executed by the computing apparatus, therefore stored in a storage apparatus and executed by the computing apparatus. In some situations, the illustrated or depicted steps may be executed in an order different from that herein, or implemented as different IC modules; otherwise, a number of the modules or steps therefrom may be implemented as a single IC module. In this way, the disclosure is not limited to any particular combination of hardware and software.

The above descriptions are merely the preferred embodiments of the present disclosure, but not to limit the scope of protection of the present disclosure.

INDUSTRIAL APPLICABILITY

The present disclosure may provide an adequate voltage and/or current start for an object to be powered according to requirements of the object to be powered and its operating environment, such that the switching rectifier may start with load according to the requirements on voltage and/or current of its power supply device and external environmental factors.

The invention claimed is:

1. A method for controlling soft start of a switching rectifier, comprising:
acquiring an external environmental parameter of a switching rectifier and a power supply characteristic parameter of an object to be powered, establishing a voltage start strategy and/or a current start strategy for the switching rectifier according to the external environmental parameter and the power supply characteristic parameter, and controlling a voltage and/or a current of the switching rectifier to start to a full-load voltage and/or a full-load current according to the voltage start strategy and/or the current start strategy,
wherein the voltage start strategy comprises:
determining at least one intermediate voltage between an initial voltage and a full-load voltage of the switching rectifier according to the external environmental parameter and the power supply characteristic parameter, obtaining voltage boost sections using the initial voltage and the full-load voltage as endpoints and using the at least one intermediate voltage as sectioning point(s), determining a voltage boost duration of each of the voltage boost sections by making a first voltage boost section proximate to the initial voltage to have a voltage boost speed larger than a voltage boost speed of a second voltage boost section proximate to the full-load voltage, and boosting the voltage of the switching rectifier in sequence according to determined voltage boost durations.

2. The method according to claim 1, wherein the current start strategy comprises:
determining a duration for boosting the current of the switching rectifier to the full-load current according to the external environmental parameter and the power supply characteristic parameter, and boosting the current of the switching rectifier from an initial current to the full-load current within the duration; or
determining at least one intermediate current between the initial current and the full-load current of the switching rectifier according to the external environmental parameter and the power supply characteristic parameter, obtaining current boost sections using the initial current and the full-load current as endpoints and using the at least one intermediate current as sectioning point(s), determining a current boost duration of each of the current boost sections, and boosting the current of the switching rectifier in sequence according to determined current boost durations.

3. The method according to claim 2, wherein the power supply characteristic parameter is acquired by a sampling operation performed on a power supply circuit of the switching rectifier or based on power supply requirements of the object to be powered.

4. The method according to claim 3, wherein the external environmental parameter of the switching rectifier comprises at least one of the following parameters:
temperature, humidity, granularity of dust, electric field intensity and magnetic field intensity;
the power supply characteristic parameter comprises at least one of the following parameters:
input voltage, input current, maximal input power.

5. A device for controlling start of a switching rectifier, comprising:

a memory storing processor-executable instructions; and
a processor arranged to execute the stored processor-executable instructions to perform steps of:
acquiring an external environmental parameter of a switching rectifier and a power supply characteristic parameter of an object to be powered;
establishing a voltage start strategy and/or a current start strategy according to the external environmental parameter and the power supply characteristic parameter; and
controlling a voltage and/or a current of the switching rectifier to start to a full-load voltage and/or a full-load current according to the voltage start strategy and/or the current start strategy,
wherein the voltage start strategy comprises:
determining at least one intermediate voltage between an initial voltage and a full-load voltage of the switching rectifier according to the external environmental parameter and the power supply characteristic parameter, obtaining voltage boost sections using the initial voltage and the full-load voltage as endpoints and using the at least one intermediate voltage as sectioning point(s), determining a voltage boost duration of each of the voltage boost sections by making a first voltage boost section proximate to the initial voltage to have a voltage boost speed larger than a voltage boost speed of a second voltage boost section proximate to the full-load voltage, and boosting the voltage of the switching rectifier in sequence according to determined voltage boost durations.

6. The device according to claim 5, wherein the current start strategy comprises:
determining a duration for boosting the current of the switching rectifier to the full-load current according to the external environmental parameter and the power supply characteristic parameter, and boosting the current of the switching rectifier from an initial current to the full-load current within the duration; or
determining at least one intermediate current between the initial current and the full-load current of the switching rectifier according to the external environmental parameter and the power supply characteristic parameter, obtaining current boost sections using the initial current and the full-load current as endpoints and using the at least one intermediate current as sectioning point(s), determining a current boost duration of each of the current boost sections, and boosting the current of the switching rectifier in sequence according to determined current boost durations.

7. The device according to claim 6, wherein the power supply characteristic parameter is acquired by a sampling operation performed on a power supply circuit of the switching rectifier or based on power supply requirements of the object to be powered.

8. The device according to claim 7, wherein the external environmental parameter of the switching rectifier comprises at least one of the following parameters:
temperature, humidity, granularity of dust, electric field intensity and magnetic field intensity;
the power supply characteristic parameter comprises at least one of the following parameters:
input voltage, input current, maximal input power.

9. A non-transitory storage medium, in which a computer program is stored, wherein the computer program is configured to implement steps of:
acquiring an external environmental parameter of a switching rectifier and a power supply characteristic parameter of an object to be powered, establishing a voltage start strategy and/or a current start strategy for the switching rectifier according to the external environmental parameter and the power supply characteristic parameter, and controlling a voltage and/or a current of the switching rectifier to start to a full-load voltage and/or a full-load current according to the voltage start strategy and/or the current start strategy, wherein the voltage start strategy comprises:

determining at least one intermediate voltage between an initial voltage and a full-load voltage of the switching rectifier according to the external environmental parameter and the power supply characteristic parameter, obtaining voltage boost sections using the initial voltage and the full-load voltage as endpoints and using the at least one intermediate voltage as sectioning point(s), determining a voltage boost duration of each of the voltage boost sections by making a first voltage boost section proximate to the initial voltage to have a voltage boost speed larger than a voltage boost speed of a second voltage boost section proximate to the full-load voltage, and boosting the voltage of the switching rectifier in sequence according to determined voltage boost durations.

* * * * *